United States Patent

[11] 3,628,868

[72] Inventor George W. Starkey
 Huntsville, Ala.
[21] Appl. No. 856,410
[22] Filed Sept. 9, 1969
[45] Patented Dec. 21, 1971
[73] Assignee The United States of America as represented by the Secretary of the Army

[54] LASER BORESIGHTING METHOD AND APPARATUS
 3 Claims, 1 Drawing Fig.
[52] U.S. Cl. .................................................. 356/152, 250/204, 250/215
[51] Int. Cl. ....................................................... G01b 11/26
[50] Field of Search............................................ 356/141, 152, 153, 138, 143, 145; 33/46 A, 46 AT; 350/296; 250/200, 204, 203

[56] References Cited
UNITED STATES PATENTS
3,551,057 12/1970 Hamilton et al. .............. 250/209
3,353,022 11/1967 Schwartz...................... 356/141
3,486,826 12/1969 Colvin et al.................. 356/152

Primary Examiner—Rodney D. Bennett, Jr.
Assistant Examiner—S. C. Buczinski
Attorneys—Harry M. Saragovitz, Edward J. Kelly, Herbert Berl and Aubrey J. Dunn ABSTRACT: A telescope having crosshairs is mounted on the housing of a laser. In order to boresight this telescope to the laser, a parabolic reflector with a four-quadrant photodetector mounted at its focus is provided. The detector has its quadrants defined by surface crosshairs, and is physically adjustable about the axis of the reflector. Microammeters are connected to show the current provided by each quadrant of the photodetector. In use, the reflector is placed in the beam of a laser, and the photodetector is physically adjusted until all microammeters show the same reading. The laser telescope is then adjusted to have its crosshairs align with the image of the crosshairs of the photodetector.

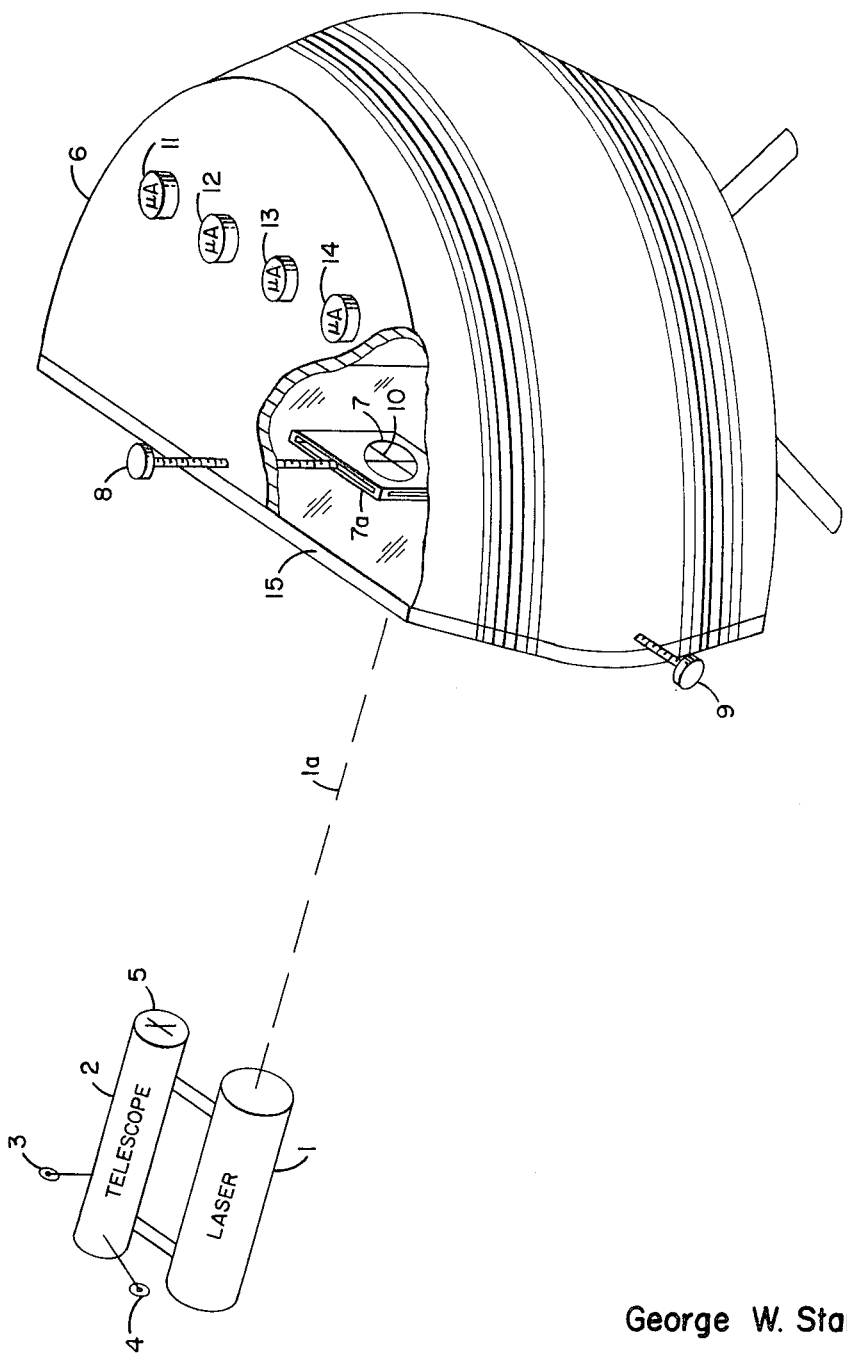

LASER BORESIGHTING METHOD AND APPARATUS

BACKGROUND OF THE INVENTION

This invention generally relates to boresighting of lasers. Various ways are known for boresighting lasers, with one of the most common ways being as follows. A laser beam is projected on a screen and the sights (crosshairs or the like) of the laser sighting telescope are adjusted to the center of the image on the screen. The beam may be focused to a point, but this involves additional equipment. For an infrared laser, further equipment is needed to make the laser beam visible. All of the known ways have disadvantages that the instant invention overcomes.

SUMMARY OF THE INVENTION

This invention is a method and apparatus for boresighting lasers. The apparatus consists of a parabolic reflector with a physically adjustable four-quadrant photodetector mounted at the focus of the reflector. The photodetector has its quadrants defined by crosshairs. Four microammeters connected to respective quadrants of the photodetector show currents dependent on the amount of reflected light falling on each respective quadrant. In use, the apparatus is placed in a laser beam, and the photodetector is moved about the axis of the reflector until equal currents are shown by all four microammeters. A sighting telescope mounted on the laser housing is then adjusted to have its crosshairs coincide with the image of the photodetector crosshairs.

BRIEF DESCRIPTION OF THE DRAWING

The single drawing FIGURE shows a schematic view of the inventive apparatus.

DESCRIPTION OF THE PREFERRED EMBODIMENT

Referring to the drawing, reference numeral designates a laser which may be boresighted with the invention. This laser has telescope 2 mounted thereon, with means such as screws 3 and 4 for adjusting the line of sight of the telescope with respect to the laser. The telescope has the usual crosshairs 5. It should be understood that the laser includes the lasing material itself, and the required power supplies, etc. The laser is mounted on a support (not shown) that keeps it stationary during boresighting. The inventive apparatus includes a front surface parabolic reflector 6 (with a portion shown cut away), with a four-quadrant photodetector 7 mounted at the focus of the reflector. The photosensitive surface of the detector faces the reflector. Means are provided for adjusting 7 back and forth and up and down about the focus point of reflector 6. These means are shown schematically as screw 8 and 9 and cross compound 7a but could take many forms. In use, reflector 6 is placed in beam 1a of the laser, and (by means not shown) the beam is focused on detector 7 to an image size the same as the size of the detector. As can be seen, detector 7 has four quadrants defined by crosshairs 10. Each of the quadrants is connected through suitable wires (not shown) and (if desired) an amplifier (not shown) to a respective microammeter. Four microammeters are shown as 11, 12, 13, and 14. Screws 8 and 9 are adjusted until detector 7 is centered in the focused beam from the laser. The relative readings of meters 11-14 are indicative of the beam position on the detector. When the detector is centered, one sights through telescope 2 and adjusts screws 3 and 4 until crosshairs 5 intersect the same point as crosshairs 10 in the reflected image of detector 7. A light attenuating glass or other material 15 is mounted on the front of the reflector, to attenuate beam 1a, and prevent damage to the detector. A light (not shown) may be provided to illuminate crosshairs 10, so that they may be readily seen regardless of attenuator 15. Obviously, one would turn off the light while adjusting the detector. Although normal safety precautions would not condone the practice, the laser could be left energized while the sighting telescope is adjusted. The laser could then provide the illumination for crosshairs 10. If one could not obtain a null condition of the meters, this would be an indication that the reflector was too far to one side of the laser beam, or that the reflector axis was at too great an angle to the reflected beam. A simple physical movement of the reflector would correct either of these conditions.

Several advantages over previous boresighting schemes are realized by the invention. Front surface parabolic reflectors are readily available in diameters exceeding 4 inches, whereas refractor lenses are easily available only up to about 4 inches. Inasmuch as a large laser system might have its sighting telescope spaced 8 or more inches from the laser axis, a reflector is a much more realistic focuser for the boresighting device than a refractor lens. Since it is not necessary to focus the laser beam to a point in the instant invention, a laser beam with divergence can be readily boresighted.

While a specific embodiment of the invention has been described, many modifications obvious in light of this disclosure may be made. For example, the detector could have lines scratched, etched, or milled on its surface rather than crosshairs. Moreover, filter 15 could be made to completely block or to pass desired frequency bands.

I claim:

1. A method of boresighting a laser mounted to a telescope having crosshairs, incorporating a parabolic reflector, a four-quadrant photosensitive detector that is defined by crosshairs and that is adjustable about the reflector axis and mounted at the reflector focus, and respective microammeters connected to each of the quadrants of the detector, including the steps of:
    positioning the reflector in the laser beam with the reflector pointed toward the laser;
    adjusting the detector about the axis of the reflector to obtain equal currents through the microammeters; and
    adjusting the crosshairs of the telescope to have a common intersection point with the reflected image of the crosshairs of the detector.

2. A device for boresighting a laser, including:
    a front-surface parabolic reflector having an optical axis;
    a four-quadrant photosensitive detector mounted at the focus of said reflector, with the quadrants of the detector defined by crosshairs on the surface of the detector;
    means for displaying the outputs of each of said quadrants, and
    means for adjusting said detector about said optical axis.

3. The device as defined in claim 3 wherein said means for displaying includes four microammeters, one connected to each quadrant of said detector.

* * * * *